United States Patent
Rawat et al.

(10) Patent No.: US 7,330,876 B1
(45) Date of Patent: *Feb. 12, 2008

(54) METHOD AND SYSTEM OF AUTOMATING INTERNET INTERACTIONS

(75) Inventors: Jai Rawat, Sunnyvale, CA (US); Silvia Doundakova, San Jose, CA (US); Vladmir Fridman, Menlo Park, CA (US); Rajalakshmi Subramanian, Sunnyvale, CA (US); Geoffrey George Chemmannoor, Sunnyvale, CA (US); Kespragada Ravi Shankar, Sunnyvale, CA (US); Subbu Gandrala, San Ramon, CA (US); Simon Waddington, Oakland, CA (US); Benedict T. S. Gladstone, Suffolk (GB)

(73) Assignee: AOL LLC, a Delaware limited liability company, Dulles, VA (US)

( * ) Notice: Subject to any disclaimer, the term of this patent is extended or adjusted under 35 U.S.C. 154(b) by 610 days.

This patent is subject to a terminal disclaimer.

(21) Appl. No.: 09/687,991

(22) Filed: Oct. 13, 2000

(51) Int. Cl.
 *G06F 15/16* (2006.01)
(52) U.S. Cl. ............... 709/205; 715/507
(58) Field of Classification Search ........ 709/217, 709/218, 219, 203, 246, 201, 205; 715/505–508, 715/513; 707/10
See application file for complete search history.

(56) References Cited

U.S. PATENT DOCUMENTS

| | | | |
|---|---|---|---|
| 5,060,263 A | 10/1991 | Bosen et al. ............. 380/25 |
| 5,159,667 A * | 10/1992 | Borrey et al. ............ 715/500 |
| 5,224,150 A | 6/1993 | Neustein ................. 397/57 |
| 5,235,654 A * | 8/1993 | Anderson et al. ........ 382/180 |
| 5,267,149 A | 11/1993 | Anada et al. ............ 364/408 |
| 5,473,667 A | 12/1995 | Neustein ................. 379/57 |
| 5,564,038 A | 10/1996 | Grantz et al. ............ 395/491 |
| 5,574,786 A | 11/1996 | Dayan et al. ............ 380/4 |
| 5,590,198 A | 12/1996 | Lee et al. ............... 380/21 |
| 5,640,577 A | 6/1997 | Schawmer ............... 395/768 |
| 5,659,350 A | 8/1997 | Hendricks et al. ....... 348/6 |
| 5,710,889 A | 1/1998 | Clark et al. ............. 395/244 |
| 5,711,000 A | 1/1998 | Ploeg et al. ............ 455/423 |
| 5,712,973 A | 1/1998 | Dayan et al. ........... 395/186 |
| 5,758,341 A | 5/1998 | Voss ..................... 707/10 |
| 5,771,347 A | 6/1998 | Grantz et al. .......... 395/186 |

(Continued)

FOREIGN PATENT DOCUMENTS

EP  780 805  6/1997

(Continued)

OTHER PUBLICATIONS

*Avoid confusing messages caused by password filters*; M. Keul; Windows Developer Magazine; Feb. 2002.

(Continued)

*Primary Examiner*—Abdullahi Salad
(74) *Attorney, Agent, or Firm*—Michael A. Glenn; Glenn Patent Group

(57) ABSTRACT

A method and system of implementing recorded data for automating interactions which occur across the Internet includes storing data at a central Web server adapted for maintaining a database. Responsive to a program script requesting data, computer program code at the central Web server selectively extracts stored data from the database, manipulates the data in accordance with the request, and supplies the manipulated data in a desired format.

21 Claims, 9 Drawing Sheets

U.S. PATENT DOCUMENTS

| | | | |
|---|---|---|---|
| 5,793,952 A | 8/1998 | Limsico | 395/188.01 |
| 5,794,259 A * | 8/1998 | Kikinis | 715/507 |
| 5,799,115 A | 8/1998 | Asano et al. | 382/305 |
| 5,821,933 A | 10/1998 | Keller et al. | 345/348 |
| 5,832,497 A * | 11/1998 | Taylor | 707/104.1 |
| 5,890,140 A | 3/1999 | Clark et al. | 705/35 |
| 5,918,007 A | 6/1999 | Blackledge, Jr. et al. | 395/186 |
| 5,963,949 A * | 10/1999 | Gupta et al. | 707/100 |
| 5,970,227 A | 10/1999 | Dayan et al. | 395/186 |
| 5,974,430 A | 10/1999 | Mutschler, III et al. | 707/505 |
| 5,991,537 A | 11/1999 | McKeon et al. | 395/704 |
| 6,029,146 A | 2/2000 | Hawkins et al. | 705/35 |
| 6,058,378 A | 5/2000 | Clark et al. | 705/37 |
| 6,070,184 A | 5/2000 | Blount et al. | 709/200 |
| 6,088,700 A | 7/2000 | Larsen et al. | 707/10 |
| 6,192,380 B1 * | 2/2001 | Light et al. | 715/505 |
| 6,192,476 B1 | 2/2001 | Gong | 713/201 |
| 6,199,079 B1 * | 3/2001 | Gupta et al. | 715/507 |
| 6,226,495 B1 | 5/2001 | Neustein | 455/31.2 |
| 6,247,029 B1 * | 6/2001 | Kelley et al. | 715/507 |
| 6,249,779 B1 * | 6/2001 | Hitt | 706/1 |
| 6,286,102 B1 | 9/2001 | Cromer et al. | 713/200 |
| 6,412,070 B1 | 6/2002 | Van Dyke et al. | 713/200 |
| 6,418,305 B1 | 7/2002 | Neustein | 455/406 |
| 6,421,693 B1 * | 7/2002 | Nishiyama et al. | 715/507 |
| 6,463,431 B1 * | 10/2002 | Schmitt | 707/5 |
| 6,496,855 B1 * | 12/2002 | Hunt et al. | 709/217 |
| 6,499,041 B1 * | 12/2002 | Breslau et al. | 715/505 |
| 6,499,042 B1 * | 12/2002 | Markus | 715/507 |
| 6,589,290 B1 * | 7/2003 | Maxwell et al. | 715/507 |
| 6,662,340 B2 * | 12/2003 | Rawat et al. | 715/507 |
| 6,694,375 B1 * | 2/2004 | Beddus et al. | 709/249 |
| 6,802,042 B2 * | 10/2004 | Rangan et al. | 715/501.1 |
| 6,845,390 B1 | 1/2005 | Jorgenson et al. | |
| 6,854,085 B1 | 2/2005 | Morse | |
| 6,859,878 B1 * | 2/2005 | Kerr et al. | 713/183 |
| 6,862,612 B1 * | 3/2005 | Horn et al. | 709/219 |
| 6,944,677 B1 * | 9/2005 | Zhao | 709/244 |
| 6,950,980 B1 * | 9/2005 | Malcolm | 715/505 |
| 6,950,983 B1 * | 9/2005 | Snavely | 715/513 |
| 6,981,028 B1 * | 12/2005 | Rawat et al. | 709/217 |
| 2001/0044810 A1 * | 11/2001 | Timmons | 707/513 |
| 2002/0062342 A1 * | 5/2002 | Sidles | 709/203 |

FOREIGN PATENT DOCUMENTS

| | | |
|---|---|---|
| EP | 918 424 | 5/1999 |
| EP | 558 222 | 8/1999 |
| EP | 1 160 648 | 12/2001 |
| JP | 580711/2001 | 1/2004 |
| WO | WO 99/46701 | 9/1999 |
| WO | WO 01/09735 | 2/2001 |

OTHER PUBLICATIONS

*A Global Semantics for Views*; Christine Choppy; Pascal Poizat; and Jean-Claude Royer, Feb. 25, 2000.

*Generic Extensions of WWW Browsers*; Ralf Hauser; and Michael Steiner; Jun. 23, 1995.

*The Future of Web-Based Workflows*; John A. Miller; Amit P. Sheth; Krys J. Kochut; and Devanand Palaniswami, 1997.

* cited by examiner

METHOD AND SYSTEM OF AUTOMATING INTERNET INTERACTIONS

The present application is related to a application, U.S. Ser. No. 09/516,048, filed Mar. 1, 2000, entitled "AN INTERNET INTERFACE SYSTEM" now U.S. Pat. No. 6,496,855. The present application is also related to a application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS" now U.S. Pat. No. 6,981,028. The disclosures of both of these copending applications are hereby incorporated by reference in their entirety.

BACKGROUND OF THE INVENTION

1. Field of the Invention

The present invention relates generally to transmission of data during Internet browsing, and more particularly to a method and system of implementing recorded data for automating interactions and transactions which occur on the Internet.

2. Description of the Related Art

Presently, many computer users primarily employ Internet browser and mail editor applications for accessing the World Wide Web (WWW, or the Web) and for corresponding via electronic mail (e-mail). The typical browser serves as the means by which a user is enabled to navigate from site to site on the Web, and further serves as the interface through which the user is enabled to interact with those sites by accessing the information content and various services provided; the typical mail editor enables the user to engage in digital correspondence, i.e. sending and receiving e-mail.

The capabilities of browser and mail editor applications can vary greatly depending upon the type of terminal and the operating system used. For example, while versions of these types of applications installed at home computers or office workstations, which typically employ graphical user interfaces (GUIs) and large display monitors, may be capable of exploiting rich text formats and high resolution graphics, the versions of the same applications which are typically installed on portable wireless devices may be much more restricted in terms of graphic resolution and display area.

When a user is employing a device having a small keypad and utilizing a browser of limited capabilities, navigation and data input can be tedious. In the case where the user is connected to the Internet or other network through an Internet-capable wireless telephone or Personal Digital Assistant (PDA), for example, entering a long Uniform Resource Locator (URL) for a desired Web site, typing a case-dependent e-mail address, or providing any other detailed information in alpha-numerical characters with a limited keypad is often difficult.

During any given session of Internet exploration, sometimes known as "Web surfing," a user may encounter one or more sites which require data input, in the form of registration and login data, before the full capabilities of the site can be accessed. In fact, sites requiring registration and login are becoming more prevalent on a daily basis. Web sites engaged in electronic commerce (e-commerce), for example, typically require registration before purchases can be made or items can be placed up for auction by a particular user. As another example, Web sites which host e-mail services necessarily require registration and login in order to deliver incoming correspondence to the correct recipient.

The registration process may vary in complexity from the very simple matter of entering data into one or two fields, to the very complicated matter of providing a social security number, credit card expiration dates, and the like. In any event, a user must navigate to a site's registration page and complete a form by providing information required for registration.

As a practical matter, irrespective of the relative complexity of the registration procedure, the user is burdened with the task of recording or remembering the information provided. At a minimum, registration at any given Web site involves providing the site with a user name, or "login" name, and a password. This data is subsequently used by the site to identify the user each time the user logs in; conversely, access to a particular account will be denied or restricted if the proper account information is not entered at login.

In addition, the user must also keep a record of the sites with which the registration process has been completed or run the risk of having multiple accounts open at the same site inadvertently, which can lead to confusion. In the case where a user intends or prefers to have multiple accounts open at the same site simultaneously, it is still incumbent upon that user to maintain accurate records of user names and passwords in order to access the various accounts.

Even in the case where a user maintains meticulous records of all the requisite information, the correct user name and password information must be provided each time the site is accessed. Typically, a registered user of a particular Web site must navigate to that site's "login page" and complete a form by providing the necessary data in order to access the site's full functionality. In this regard, even accurate records are not useful if they are not accessible; when a user stores registration information conveniently near a home computer, for example, those records will not be of value when that user is attempting to access an account from a mobile or wireless apparatus or from a computer at another location, such as an office, a library, or a Web cafe. Presently, since even portable and wireless devices are Internet-capable, a user may access the Web or e-mail accounts from virtually any building having telephone service or from any location where cellular or satellite communications are possible. Unless such a user commits numerous user names and passwords to memory, or endeavors always to keep written notes within reach, careful record-keeping practices can ultimately prove of limited utility.

Further, many Web sites request users to supply data through the process of filling out forms independently of any registration or login processes. A browsing user is often required to submit information such as mailing address, billing address, credit card information, or e-mail address. With Internet activity increasing and e-commerce growing at a fantastic rate, there is a continuing and escalating need for a convenient and efficient system for organizing a user's personal account information and, more importantly, implementing that information during Web browsing.

Such a system should take into account the fact that many users are presently accessing the Internet from multiple locations and multiple computer terminals or workstations, some of which may have small or limited-function keypads and lack sophisticated input devices and displays. Moreover, to provide maximum convenience and utility, a system organizing and implementing a user's account information should automate much of the interaction which is currently completed manually.

SUMMARY OF THE INVENTION

The present invention addresses the foregoing and other shortcomings of conventional Internet communications and data transmission interactions by providing a system for automating many of the tedious interactions which are required of a user during a typical Internet browsing session.

In one embodiment, the system of the present invention includes storing a registered user's personal account information in a secure, encrypted central database which is accessible from any Internet-capable device with a single user name and password. For example, a user name and password may be stored in association with an account at a particular Web site, along with the Uniform Resource Locator, or URL, of that site's login page. For a second account at a second Web site, the user may have selected a different user name and a different password; this information, likewise, is stored in the central database, along with the URL for the login page of the second Web site. Upon login to the system of the present invention, the registered user has access to the full functional capabilities of the unique interface provided by the system, as well as any and all account information related to that user's various Web site specific accounts. Ideally, this system requires memorization of only a single user name and a single password, regardless of the number of specific accounts which are maintained at any of a plurality of different Web sites at any given time.

Specifically, the present invention is related to a system providing an interface between the foregoing central database and the various Web sites visited by the user during the course of browsing the Internet. In one embodiment, a utility window or navigation bar may be appended to the user's standard browser navigation window, and may be used to interface with the system and to access its capabilities. In another embodiment, standard elements of a browser may enable a user to access the functional capabilities of the system directly; this embodiment may be particularly desirable for use in conjunction with text-based browsers, such as are employed by Personal Digital Assistants (PDAs) or Internet-enabled wireless telephones, for example. The programming scripts employed by the system, and invoked through the browser, automate many of the tasks ordinarily completed manually by the user.

According to one embodiment of the present invention, for example, a user's personal information stored in the central database is accessed by the system such that registration forms associated with opening an account may be completed automatically. As an example, the system may be adapted separately to maintain a vast database of common Web sites, including the URLs of their respective registration pages as well as the nature and format of their respective registration forms. Convenient hyperlinks may be offered to a user through the browser, for instance, upon login to the system such that if the user desires to register with a mapped Web site, the program code embodied in the system communicates with the proper site and completes the appropriate sections of the registration form without intervention on the part of the user. In addition, if a user desires to register with a Web site and independently navigates to the page containing the form, the system may be adapted to recognize that the user is attempting to create a registered account which has not previously been recorded, and may prompt the user to record the registration information if desired.

Further, the form filling feature of the present invention is not limited to registration forms. Many other types of forms exist in the Internet universe, and the present invention is adapted to access recorded user data and to implement the same in filling virtually any type of form a user is likely to encounter. In particular, a common type of form which is filled on a regular basis is a login form; the system of the present invention provides an automatic login procedure through which a user may be automatically logged in to a pre-existing registered account.

In accordance with this aspect of the present invention, a user may login to a Web site or mail server quickly and easily without having to re-enter a user name and password at each subsequent visit. As noted above, the central database may store a specific user name and password associated with each and every account maintained by the user; when the user wishes to access a particular account at a specific Web site or mail server, the present invention allows the user to invoke program scripts at the central server which automate the login procedure. The central server navigates to the proper page or site, identifies the login form, accesses the appropriate user name and password information from the database, completes the form with the proper user data extracted from the database using a fuzzy fill procedure, and submits the form on behalf of the user automatically, thus logging the user into the account at the site. As noted above, such automation may be particularly desirable in the case where a user is operating a terminal having a limited-function keypad or cumbersome navigation tools.

Additionally, the system may be adapted to recognize when a user is attempting to login manually to an account which has not already been recorded in the central database, and may prompt the user to record the account information if desired. The user may thereby be relieved of the obligation to remember which password is associated with which account at a given Web site.

As indicated above, an important aspect of the present invention is that its operation is not limited with respect to location or to a particular computer terminal or workstation. Upon registering with the system for the first time, the user is subsequently enabled to access its functionality from virtually any Internet-capable computer terminal or device.

BRIEF DESCRIPTION OF THE DRAWINGS

The above-mentioned and other advantages of the present invention will become more apparent upon examination of the following detailed description of the preferred embodiments thereof with reference to the drawings, in which.

DETAILED DESCRIPTION OF THE PREFERRED EMBODIMENTS

Figure 1:
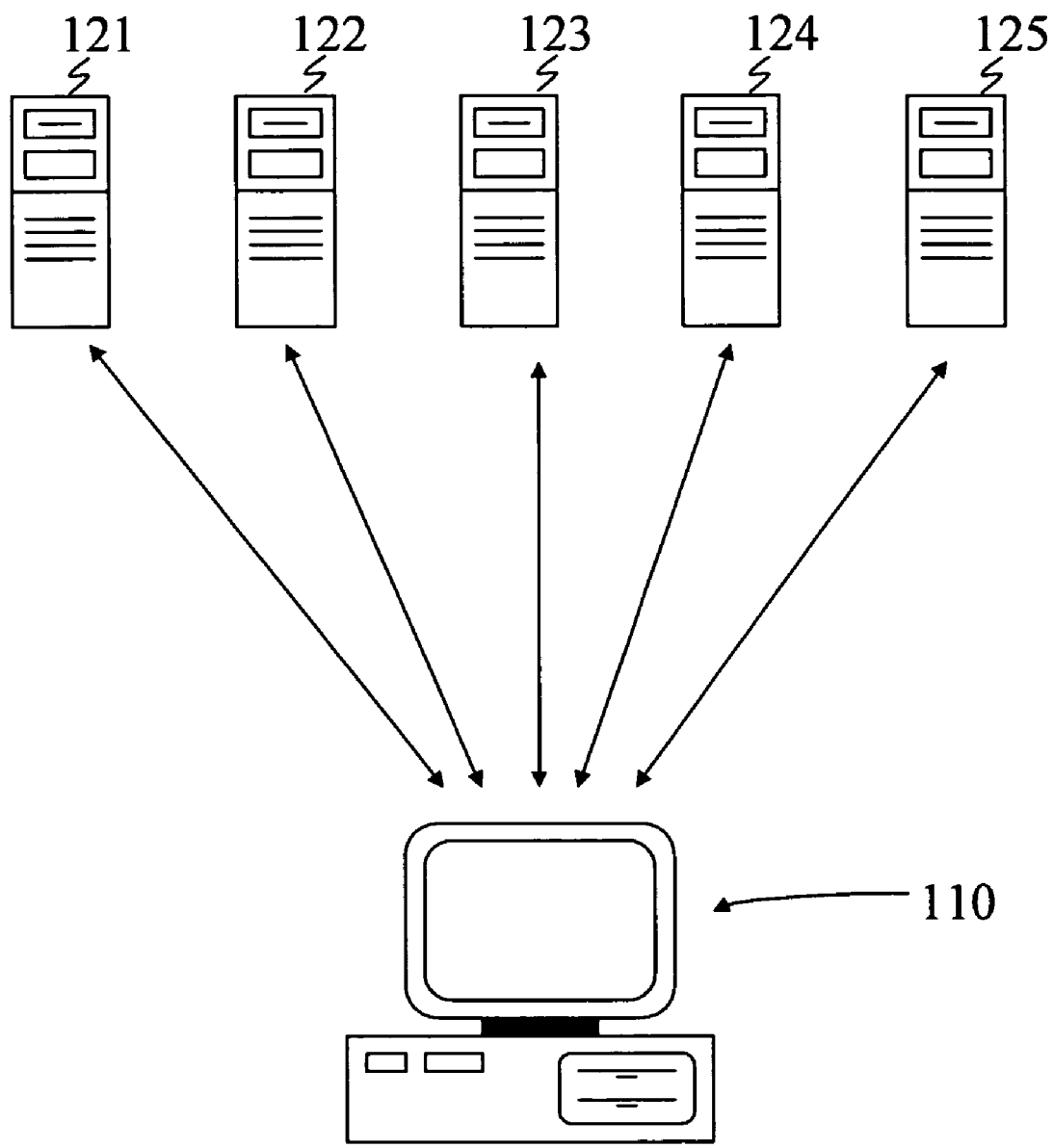
FIG. 1 is a simplified diagrammatic view of the interaction presently required between an Internet user and several sites with which that user may maintain registered accounts.

Turning now to the drawings, FIG. 1 shows a simplified diagrammatic view of the interaction presently required between a typical Internet user and several sites with which that user may maintain at least one registered account. Conventionally, a user connects to the Internet by means of a computer terminal 110 such as a desktop personal computer (PC) or workstation, a laptop, notebook, subnotebook, or portable machine such as a Personal Digital Assistant (PDA), a Personal Communications Systems (PCS), an Internet-enabled wireless telephone or other wireless hand-held device, and the like. Once connected to the Internet, the user accesses e-mail accounts and visits Web servers, or sites, such as those represented by reference numerals 121-125, through means of one or more software applications, such as a Web browser. During the course of visiting the numerous sites which form the framework of the Internet, the user is frequently prompted to register, or to open an account, with a particular site; registration serves both to enable the Web server to identify the user as well as to simplify certain aspects of interaction with the site for the user on subsequent visits.

For example, sites which specialize in auctions, sales of goods, service oriented business transactions, and the like via the Internet (e-commerce), frequently require a user to maintain a registered account at the site before the user may be permitted to use services offered at the site. The amount and type of account information for a particular user maintained at any given site varies considerably, depending upon the nature of the business conducted; some examples of the nature of information requested from the user during registration include first and last name, date of birth, mailing address, gender, social security number, credit card numbers and expiration dates, mother's maiden name, and so forth. Billing addresses and preferred shipping addresses are common data requested by e-commerce sites specializing in the sale of goods. In theory, the sites' maintaining respective databases of such information for a registered user offers the user convenience and efficiency upon subsequent visits to the Web site.

In practice, however, registering with Web sites often places a significant burden on the user. Providing the site with required or requested information generally involves completing and submitting a form. Completing such forms is onerous, and unavoidably introduces the possibility of error, such as misspellings or transposition of numbers, with every submission. Particularly when the user is operating a PDA, an Internet-capable wireless PCS, or other hand-held device which may have limited or awkward input mechanisms, data entry can be exceptionally problematic. Additionally, once the form has been submitted and the registration process is complete, it is incumbent upon the user to remember the user name and password required to access the registered account.

Looking more closely at FIG. 1, the effect of a user's maintaining an account at a plurality of sites is apparent. At a minimum, registration with a Web site, such as sites 121-125 in FIG. 1, requires creating an account which can be accessed only by supplying the correct user name and password during login. That is, in order to access the full range of services provided at a particular site upon subsequent visits, a user is required to submit, through computer terminal 110, the user name and password selected originally during the registration process.

As is evident from inspection of FIG. 1, a user having a separate account at each of sites 121-125 is required to maintain accurate records of at least five separate user names and passwords. While certain of these user names and passwords may be used for more than one account, users often feel that use of a different user name and password for each account is preferable for security reasons.

During a typical Web browsing session, a user may wish to login to a registered account at a particular Web site, for example, site 121 in FIG. 1. To login to site 121, the user must first navigate to the correct login page associated with site 121. Upon arriving at the login page, the user is presented with a login form, into which the user must enter the correct user name and password in order to access the account. When the form is completed and submitted, the user is logged into the appropriate account at site 121. If the user then wishes to login to a different registered account which may be at a different Web site, such as site 122 in FIG. 1, for example, the above process must be repeated at the appropriate login page for site 122. As noted above, navigating from site to site and entering user account data on a portable or mobile device may be particularly cumbersome and awkward.

In the case where a user is not registered with a particular site, such as site 123 in FIG. 1 for example, the user may be required to register prior to making full use of the services available. To register with site 123, the user must first navigate to the correct registration page associated with site 123. Upon arriving at the registration page, the user is typically presented with a form, into which the user must enter a wide range of registration information in order to create an account. When the form is completed and submitted, the user may subsequently login to the newly created account, for example, in the manner described above.

In any event, account data must be transmitted between the user's computer terminal 110 and the various sites 121-125 each time the user wishes to login to a particular account; these data transmission interactions are represented by the arrows in FIG. 1. The interaction between the user and the Web site, required in the name of "convenience," is ultimately tedious and necessarily subject to error. Further, as noted above, the data required during the registration and login procedures are typically unique for each account, requiring the user to remember such data or to record it in a convenient, yet secure, location.

Figure 2:
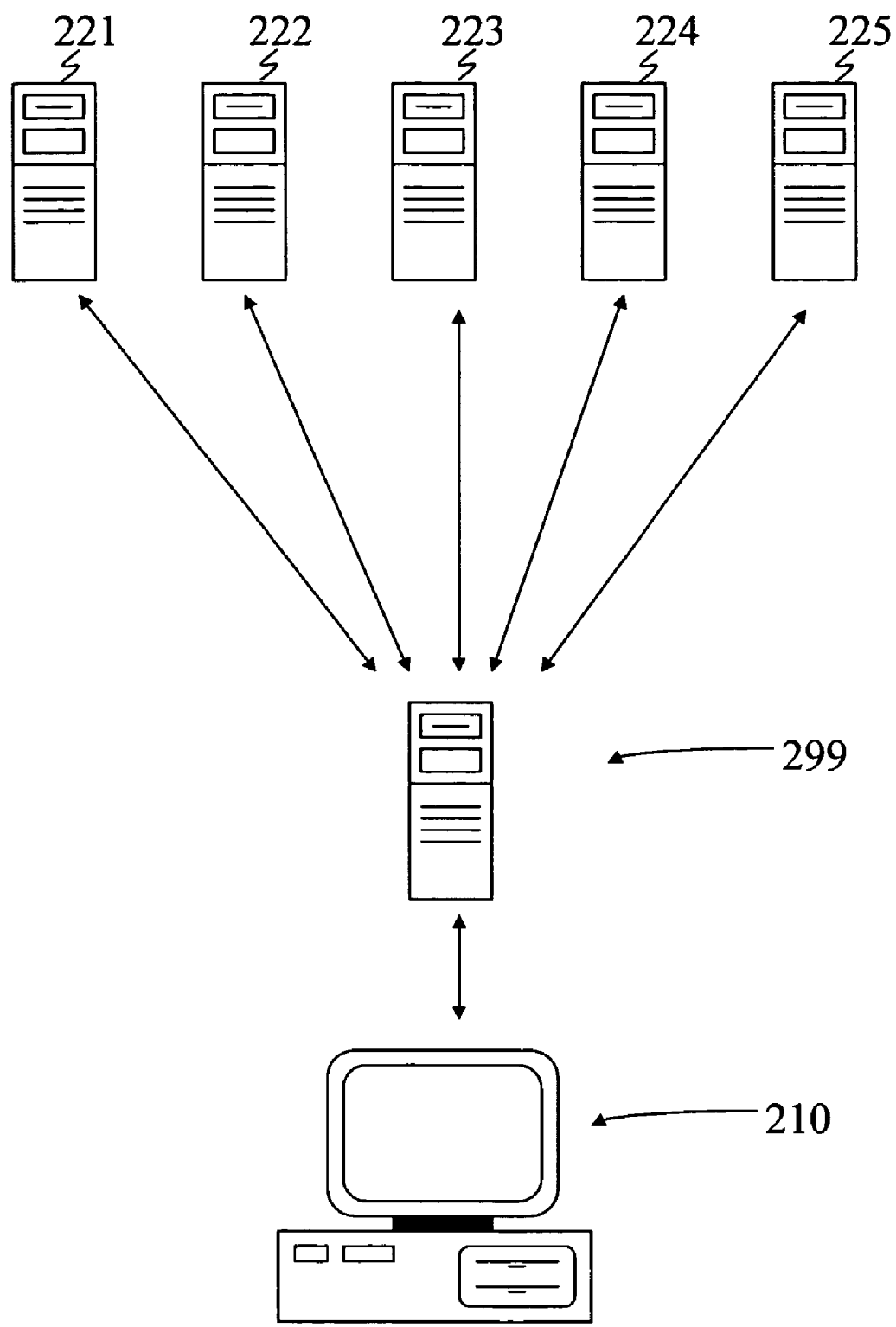
FIG. 2 is a simplified diagrammatic view of the interaction required between an Internet user and several sites with which that user may maintain registered accounts, with the system of the present invention acting as an intermediary.

FIG. 2 is a simplified diagrammatic view of the interaction required between an Internet user and the system of the present invention acting as an intermediary between the user and the various sites with which that user may maintain registered accounts. As illustrated in FIG. 2, the user's computer terminal 210 corresponds to computer terminal 110 illustrated in FIG. 1.

As discussed above, computer terminal 210 may be any type of Internet-capable machine, including PCs and workstations as well as a wide variety of portable devices such as PDAs, PCSs, Internet-enabled wireless telephones, other wireless hand-held devices, and so forth. Additionally, users may have access to the Internet through communication and navigation systems installed in vehicles such as automobiles or boats, for example, or through interactive, Internet-capable television systems (cable or satellite based), and the like. Those of skill in the art will appreciate that the present invention is not limited by the type of device used to access the Internet; the method and system set forth herein are equally applicable to any and all Internet-enabled devices. Importantly, the method or means by which computer terminal 210 is connected to the Internet is immaterial. The connection may be through traditional land-line telephone "dial-up" service, Digital Subscriber Line (DSL) service, a T-1, T-3, or ISDN network, fiber-optic or cable modem connections, wireless or satellite communications, and the like.

It will be appreciated by those of skill in the art that the method of connection may affect the communication protocols employed by the network hardware as well as the file format required by the user's computer terminal 210. For example, whereas a PC or workstation equipped with a traditional Graphical User Interface (GUI) and Internet browser software may be adapted to display Web content provided in Hypertext Markup Language (HTML), various mobile or wireless devices such as PDAs, PCSs, and the like may be adapted to display different types of markup languages such as Extensible Markup Language (XML), Hand-Held Device Markup Language (HDML), Wireless Markup Language (WML), compact HTML (cHTML), extensible HTML (xHTML), Dynamic HTML (DHTML), and so forth. In general, connection with a mobile or cellular Internet Service Provider (ISP) automatically establishes the correct protocols and determines the proper file format for the specific type of network connection and computer terminal 210. The system of the present invention is not limited to a specific markup language or file format.

Once the connection to the Internet is made, irrespective of the method, the user may employ a software application, such as a Web browser installed on computer terminal 210, for example, to navigate to a Web site hosting a centralized server and database, such as indicated by reference numeral 299. In the case of a PDA or other portable or wireless computer terminal 210, Internet navigation and e-mail functionality may be handled by the operating system and proprietary software which is provided by the manufacturer of the device.

In the several embodiments of the present invention, the user may open a registered account at the central, Web-based server 299. This registration procedure, as with typical Web site registrations, requires the user to select a user name and password for identification and security purposes, respectively. Upon registration with central server 299, the user may login to the registered account on subsequent visits by completing and submitting the login form with the correct user name and password. The foregoing procedures are not substantially different from the typical registration and login procedures required by ordinary Web sites. The present invention provides substantial benefits in terms of convenience and utility, however, after the user is logged in to the registered account at central server 299.

For example, as is illustrated in FIG. 2, the user need only login once, to central server 299, during a particular Web browsing session; subsequent form filling and login procedures at various other sites, such as sites 221-225, for instance, require little or no interaction on the part of the user. Data transmission interactions are represented by the arrows in FIG. 2. With respect to form filling or registration procedures, for example, central server 299 may handle all data entry, completing forms automatically; the user need only review the information for accuracy and submit the completed form. It may be desirable in certain circumstances to submit the completed form on behalf of the user directly from central server 299; this submission must be made through the user's computer terminal 210, but may be accomplished without requiring any action by the user. With respect to subsequent login procedures for registered accounts at other Web servers such as 221-225, central server 299 may handle the navigation, data entry, and login form submission tasks automatically, logging the user in to a desired account at a particular Web site with virtually no action required by the user.

Advantageously, central server 299 is adapted to maintain a detailed database for the user, including a vast array of personal information supplied by the user. The data recorded may be both general as well as account-specific. For example, general, or global, information may include first and last name, primary billing address, and social security number, and the like; this information is typically constant, irrespective of the Web site with which an account may be maintained. Examples of account-specific information may include user name and password, URL of the login page for the account, favorite genre of literature, and the like; this information may vary according to the information most relevant to the particular site with which the account is maintained.

Importantly, the foregoing general and account-specific information recorded in the database is easily accessible to the user, through login with central server 299, and may be transmitted at appropriate times automatically through the functionality of the system as set forth in detail below. In this regard, the user name and password associated with the user's registered account with central server 299 become global; the user need only remember these two items of information to allow the system of the present invention, through central server 299, to serve as an interface with the rest of the Internet universe. The user is thus relieved of the burden of remembering, for example, the URL of a site's login page along with the user name and password selected for a particular account at that site.

Figure 3:
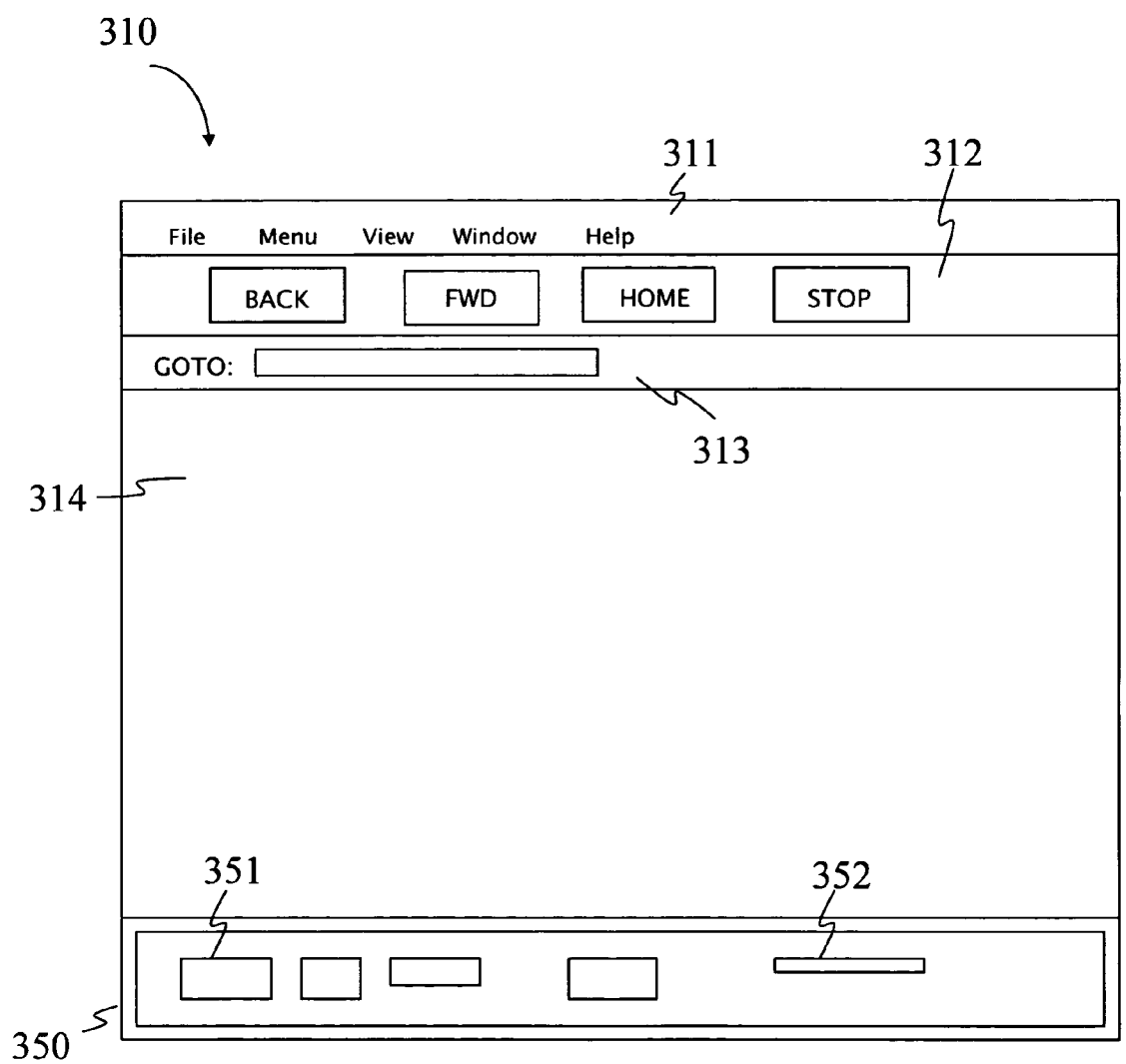
FIG. 3 is a simplified view of the Graphical User Interface presented by an ordinary Web browser application modified to include one embodiment of the interface of the present invention.

In one embodiment of the present invention, a unique interface is provided for accessing the functionality of the system. FIG. 3 is a simplified view of the GUI presented by an ordinary Web browser application modified to include the expanded interface of the present invention. A conventional Web browser application provides the user with a GUI 310 through which interaction with the Internet is enabled. In a standard configuration, GUI 310 may include a menu bar 311 for interacting with the browser software, a control bar 312 for navigation, data management, and other purposes, and a text box 313 for entering text, such as the URL of a desired Web site, for example. These elements are common in the art. The primary element of the browser GUI 310 is the navigation window 314, in which the contents of the various Web sites and pages are displayed; Web site content includes, for example, text, video, hyperlinks to other Web sites, and interactive forms which must be completed and submitted.

As can be seen at the bottom of FIG. 3, the Web browser GUI 310 modified in accordance with this embodiment of the present invention includes a utility window 350 appended to navigation window 314. In this embodiment, utility window 350 serves as an interface for accessing the various capabilities of the system; the requisite code for expanding the capabilities of the browser to include utility window 350 may be downloaded and installed into the user's computer terminal 210 automatically upon registration with the central server 299 in FIG. 2, for example. As an alternative, the browser software may be modified independently of the registration process, such as, for example, after the user already has a registered account and wishes to access that account from a computer which does not already have the software for utility window 350 installed.

A detailed description of FIG. 3 related to the installation and operation of utility window 350, as well as the interaction between browser software, utility window 350, and the functionality of the system software is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

In another embodiment which may be particularly convenient when employed with devices having limited graphical capabilities or Web browser software adapted for text-only displays, the system of the present invention does not make use of supplemental software code at the user's computer terminal 210. It may be desirable, for example, not to rely upon enhanced user interface mechanisms, such as utility window 350 illustrated in FIG. 3, for invoking the software code provided at central server 299 of the present invention. In certain instances, due to the operating system or the display capabilities of the user's computer terminal 210, network communication bandwidth, file format, or other factors, inclusion of such enhanced user interface features may be impossible. The present invention may be adapted to these situations through implementation of software code at the central server, such as server 299 in FIG. 2. In this embodiment, the functionality of the software code at the central server is not necessarily dependent upon, nor responsive to, any additional code installed at the user's computer terminal.

Figure 4:
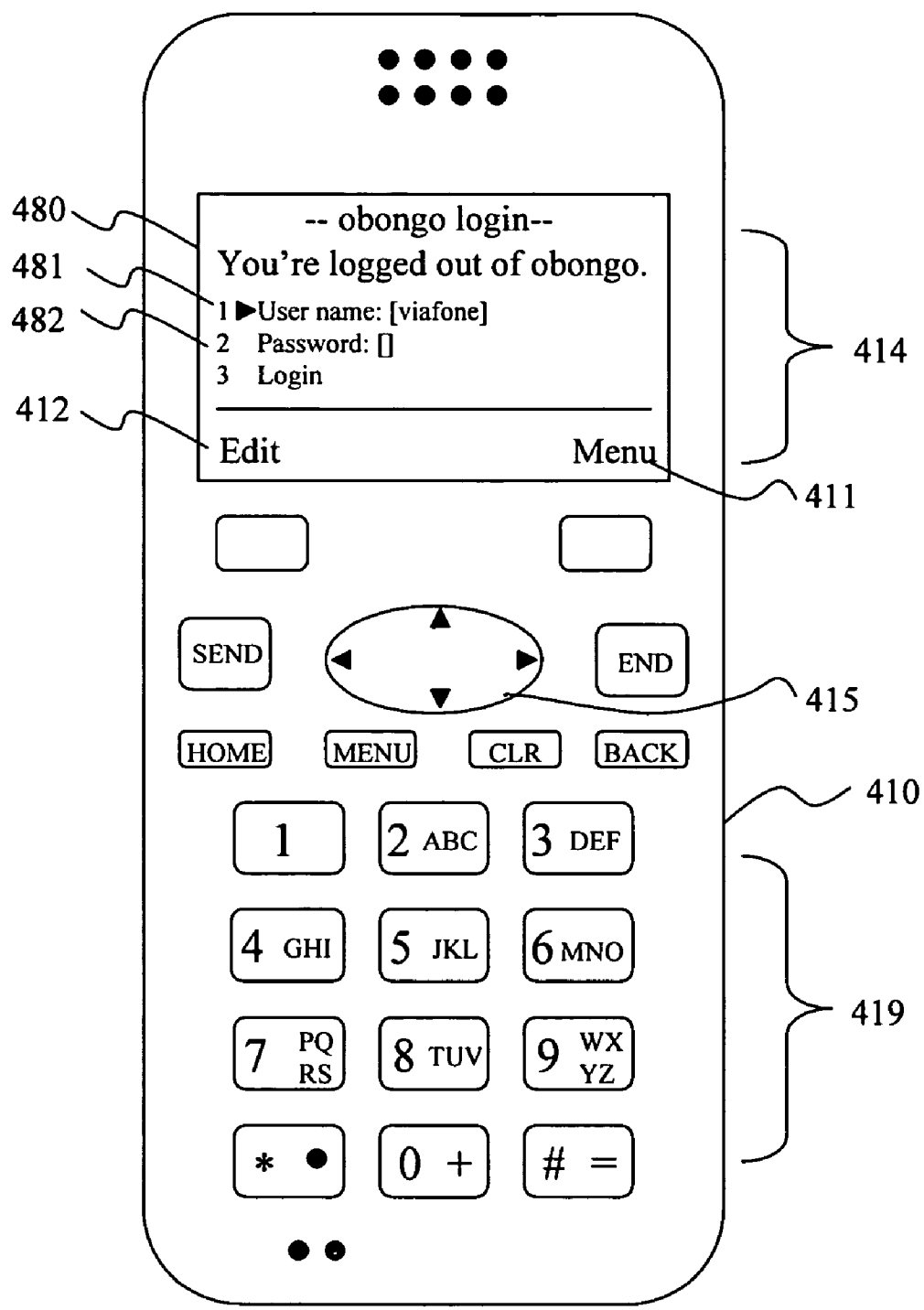
FIG. 4 is a simplified view of the user interface and navigation tools presented by an exemplary Internet-capable wireless device.

FIG. 4 is a simplified view of the user interface and navigation tools presented by an exemplary Internet-capable wireless device for use in accordance with this embodiment of the present invention. The user's device 410, which corresponds to the computer terminal 210 shown in FIG. 2, is illustrated in FIG. 4 as an Internet-capable wireless telephone or PCS. As noted above, device 410 may alternatively be a PDA, subnotebook, or other portable computer terminal. In this embodiment, the user interface 414 may be text-based or otherwise limited in terms of graphics resolution or display area. A navigation tool 415 is generally provided for enabling a user to interact with various options provided in user interface 414, such as scrolling through items displayed in user interface 414, accessing a menu feature 411 or editing function 412, or entering text required by forms encountered during Internet activity.

As shown in FIG. 4, user interface 414 of device 410 is capable of displaying a form 480 which requires certain data to be entered into fields 481 and 482. Of particular interest in FIG. 4 is the alpha-numeric keypad 419 which enables a user to enter data into fields 481 and 482. As is typical of portable devices such as PDAs and PCSs, virtually every button or key of keypad 419 represents a combination of letters and numbers, and is associated with more than one function. Entering case-dependent user name information into the user name field 481 and a case-dependent password into the password field 482 is a complicated and tedious matter when a user must employ such limited data entry tools as keypad 419.

Given the limited capabilities of user interface 414 illustrated in FIG. 4, it may be desirable to provide the full functionality of the system at the central server. Whereas the user's browser software was altered to include additional program code for inserting utility window 350 in FIG. 3, user interface 414 in FIG. 4 remains unaltered. The user of Internet-capable device 410 shown in FIG. 4 may take advantage of the full functionality of the system merely by logging in with the central server of the present invention.

As noted above, browser software, or perhaps a mobile operating system itself, at the user's computer terminal 210 or 410 generally serves as a front-end interface between the user and the system; the system, in turn, provides an interface between the central server 299 of FIG. 2 and the various sites 221-225 visited by the user, automating certain tedious tasks commonly encountered during Web browsing. In particular, the functionality provided by the system is substantially as follows: effective universal Internet identity and e-mail filtering and forwarding; automatic form filling for virtually any form encountered during Web browsing; and automatic login to sites where a registered account is maintained. These functional aspects of the system are addressed in detail below.

As described above with reference to FIG. 2, upon registration with central server 299, the user has an effective universal user name and password. Once logged into the registered account with central server 299, the user need not remember any additional passwords or other information which may have been disseminated to the various Web sites 221-225 for the purpose of registering or maintaining an account therewith. The requisite information is stored in one or more database records at central server 299 and is readily accessible by the user once logged in to the system. In addition to being relieved of the burden of remembering and organizing an overwhelming amount of information, another benefit to the user of the system of the present invention is that the universal user name and password facilitate e-mail filtering and forwarding.

Figure 5:
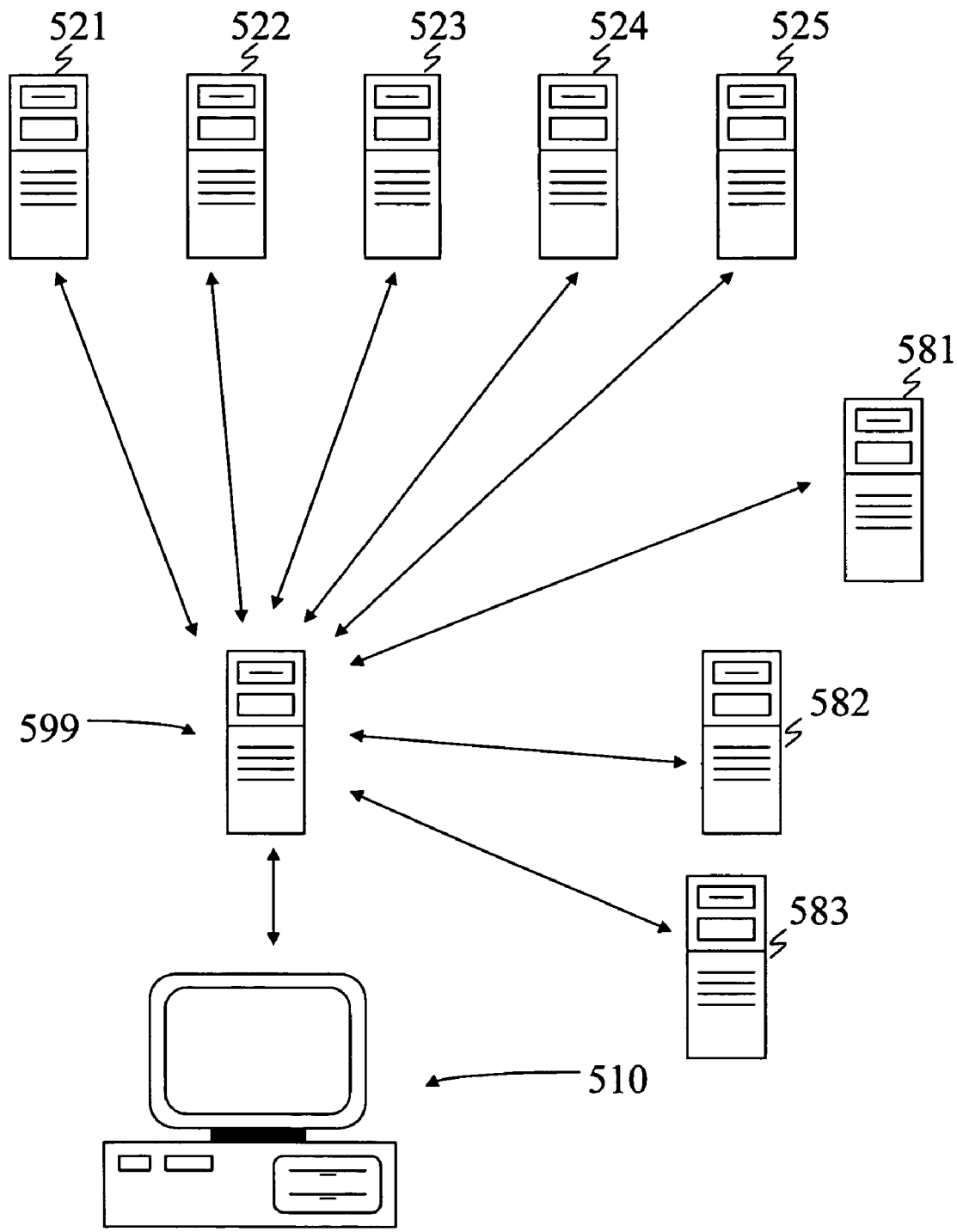
FIG. 5 is a simplified diagrammatic view of the interaction between the central server of the present invention and several servers with which a user maintains registered accounts.

FIG. 5 is a simplified diagrammatic view of the interaction between the central server 599 of the present invention and several servers 581-583 with which a user maintains registered accounts. In FIG. 5, central server 599 corresponds to that represented by reference numeral 299 in FIG. 2, and the user's computer terminal 510 corresponds to computer terminal 210 or Internet-capable device 410. Various Web sites 521-525 are shown in FIG. 5 along with a plurality of servers, denoted as servers 581-583, at which a user may maintain one or more registered e-mail accounts. The servers 581-583 may, for example, correspond to a user's home e-mail account, school e-mail account, and work e-mail account, respectively. It will be appreciated that a user may maintain more or fewer than three e-mail accounts, and furthermore that more than one e-mail account may be maintained at a single server; accordingly, the arrangement of FIG. 5 is illustrated by way of example only.

According to one embodiment of the present invention, a user may be provided with a universal "virtual" e-mail address upon registration with central server 599. This universal e-mail address may be characterized as virtual because the system may not actually maintain a full service e-mail account for the user at central server 599, but rather only function to forward incoming mail to one or more of a plurality of registered e-mail accounts at one or more of a plurality of servers designated by the user. For example, e-mail delivered to the user's universal virtual e-mail address at central server 599 may be selectively forwarded to a single account at server 581 exclusively, or it may be selectively forwarded to one or more registered accounts at all of the servers 581-583. In any event, the user's friends, relatives, business contacts, and others representing the entire Internet universe all will be sending electronic correspondence to a single address at central server 599, where it may be directed according to the user's preference.

A detailed description of the universal virtual e-mail functionality of the present invention is set forth with reference to FIG. 4 in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

Figure 6:
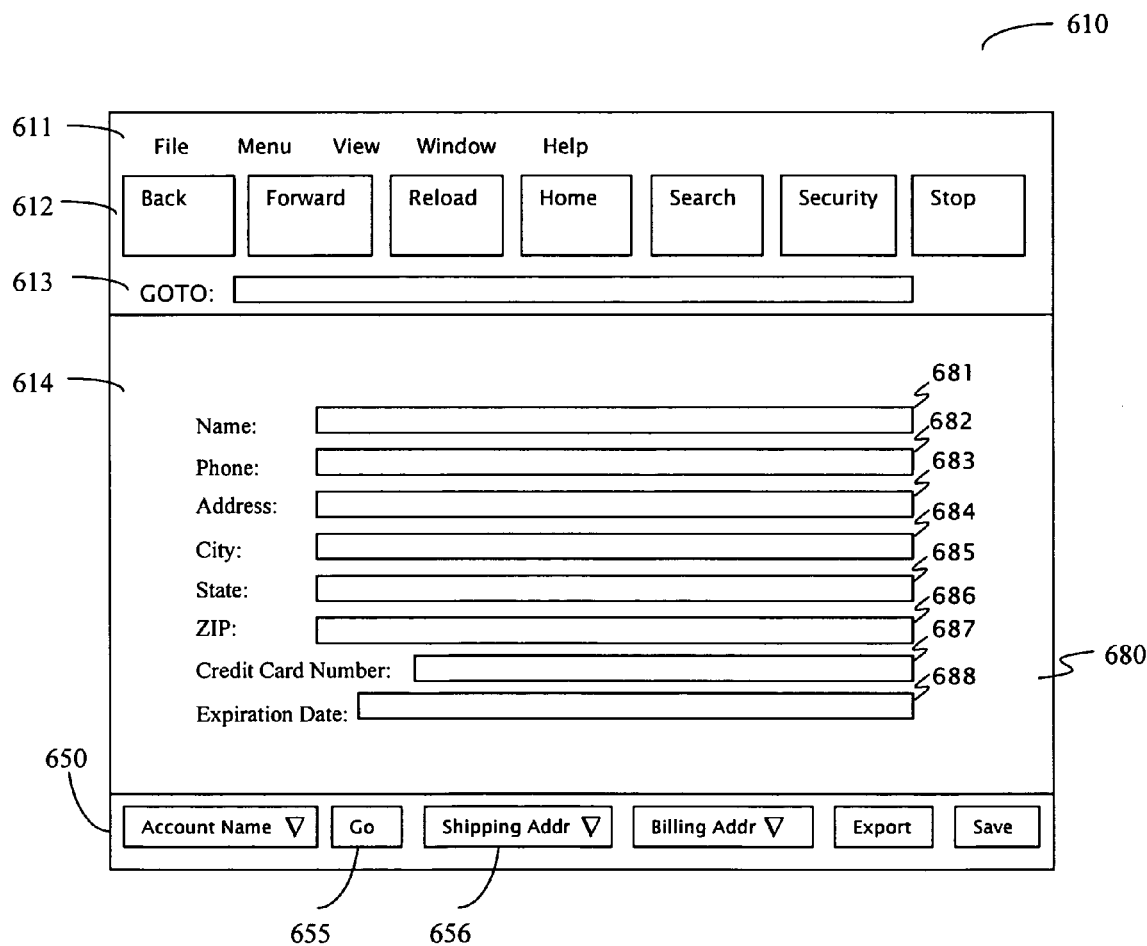
FIG. 6 is a simplified view of a typical form which may be encountered by a user during an Internet browsing session.

Web sites often request that a browsing user supply information, and many of the most popular Web sites, particularly those engaged in e-commerce, actually require as much. As a consequence, a user is often faced with the onerous task of filling out forms during a given Web browsing session. FIG. 6 is a simplified view of a typical form 680 which may be encountered by a user during an Internet browsing session.

In addition to the form 680 itself, FIG. 6 also shows the entire browser GUI 610, complete with the standard menu 611, control bar 612, text box 613, and navigation window 614, in which form 680 is displayed. The GUI 610 illustrated in FIG. 6 has been modified to include the utility window 650, through which the various functions supported at the central server, such as server 299 or 599, may be accessed. In particular, utility window 650 includes at least one operative button, such as button 655, which enables access to the automatic form filling feature of the present invention. As an alternative, access to the automatic form filling feature may be provided by means other than a button, for example, through a drop-down menu such as 656.

It will be appreciated that the particular form 680 illustrated in FIG. 6 is representative only, and further that a different browser may require display of form 680 in a very different manner. As noted above, some PDAs or Internet-capable wireless telephones may be incapable of reading HTML documents, for example; as a consequence of the different file format, such as XML, WML, or HDML, which may be required by the device or the protocol of the network over which the device is communicating, the presentation of form 680 may be very different from that illustrated in FIG. 6. That is, form 680 may be presented in a manner similar to that depicted as form 480 in FIG. 4. In the embodiment illustrated in FIG. 4, access to the automatic form filling feature may be provided as an active option in menu 411, for instance.

As noted above, even forms requesting identical data may require submission of that data in different formats. For example, the "Name" field 681 may be subdivided such that a different form may request the same data in three different fields corresponding to last name, first name, and middle name. Likewise, the "Phone" field 682 may be subdivided into three different fields corresponding to area code, exchange, and last four digits; a fourth field may be included for an extension number. Similarly, various forms additionally include drop-down menus or radio buttons wherein the user is requested to select, for example, an age range, an occupation or title, or a preferred credit card type from a limited list.

As described above, the system of the present invention maintains detailed records of information provided by a user both during the registration process and subsequent to registration, at the user's discretion. That is, when a user creates a registered account at the central server, the server creates a database record for that particular user; various user data may be retained. The server may request information from the user in as granular a format as possible; that is, telephone numbers, for example, may be segmented into at least four fields corresponding to country code, area code, full telephone number, and extension. As another example, names may be stored at the server in first name, middle name, last name format rather than as a single field. In this manner, the system of the present invention may be adapted to provide data to various forms requiring data in any one of numerous formats.

By way of background, typical forms encountered during Web exploration may be encoded in the HTML documents, or pages, visited by the user during browsing. In the case of wireless PDAs and Internet-capable telephones, the documents may be in another format, such as HDML, WML, cHTML, xHTML, DHTML, and the like, as noted above. It will be appreciated by those of skill in the art that the present invention is not limited to any specific document format or communication protocol; the following discussion refers to these file formats using the generic term: markup language (ML).

Any given ML page may include one or more forms, distinguished in the underlying ML code. The system of the present invention utilizes program code at the central server to parse the ML pages when the user invokes the form filling function. The program code is adapted to identify text strings in the ML code which represent forms embedded therein; each form contains one or more "meta types" recognizable by the system. Each meta type represents a logical data block comprising one or more information fields which are logically related in a meaningful way. Each information field, in turn, has a particular format associated therewith. The foregoing hierarchy of form components assists the system in assigning the granular user data to the correct location in the form during the form fill process.

In this regard, it will be appreciated that classifying different types of data according to meta type enables the system to approach the task of completing forms in an efficient manner which minimizes system overhead and user inconvenience. Either before or during the form fill process, for example, each meta type in its entirety, along with the specific data used for filling its fields, may be selected independently; that is, the user may employ drop-down menus or other GUI mechanisms provided in the utility window to select from a plurality of previously stored data within a given meta type. The interface in the utility window may be adapted to accommodate such selection through inclusion of a drop-down menu for each meta type, for example. In the case of user interfaces limited to text-only displays, a separate text-based menu may be provided for user selection of meta types; as noted above, such an option may be made accessible through the menu option 411 in FIG. 4, for example.

A detailed description of meta types and the form filling functionality of the present invention is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

In accordance with one embodiment of the present invention, the user data stored at the central server is extracted from the database and manipulated so as to conform with the formatting requirements of the form by the program software at the server. The properly formatted user data may be used to fill a desired form such that the user need not enter the information manually; subsequently, the filled form may be transmitted to the user's computer terminal or portable device for verification or alteration. In an alternative embodiment, it may be desirable to utilize program code at the server to submit the filled form automatically, without any interaction from the user. While the number, type, and format of forms a user may encounter on the Internet are as varied as the number of Web sites requesting their completion, the system of the present invention recognizes any given form as falling into one of two broad categories: those forms which have been mapped into the system's database; and those forms which have not been mapped.

In addition to maintaining a database of user information at a central Web-based server, the system of the present invention is adapted to maintain a database of form data related to the numerous forms which may be encountered most often by users browsing the Web; these forms, required or requested by the most popular or most frequently visited Web sites, for example, may be mapped. Mapped forms have been parsed, for example, by a software script adapted to read the underlying ML code of the Web page containing the form.

The mapping process enables the system to recognize a previously mapped form upon subsequent encounters therewith; recognition of a particular form's fields and structure, in turn, enables the program code at the server to input the correct user data into each field, in the proper format, efficiently and systematically. Accordingly, mapping a form may involve all of the following: examining the underlying ML code for the purpose of analyzing the form's structure and arrangement; identifying the required fields, the optional fields, and the requested format of each; matching the form fields with the user data fields in the database to which they correspond; and recording all of the foregoing information under a unique identifier string through which the system may prospectively identify that particular form.

A detailed description of the ML parsing process, the mapping procedures used by the system of the present invention, and the granularity of database records is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

Figure 7:
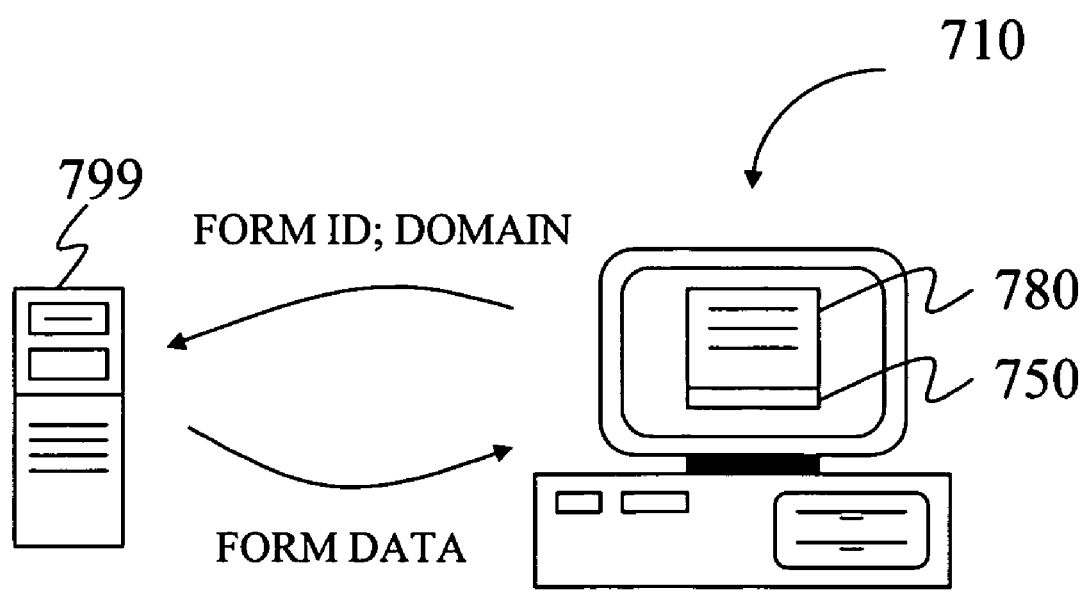
FIG. 7 is a simplified diagrammatic view of one embodiment of the interaction between the central server of the present invention and a form page of a typical Web site.

In one embodiment, the form filling feature of the present invention may employ both the program code at the central server as well as the code underlying the enhanced interface, such as described above with reference to FIGS. 3 and 6, provided at the user's computer terminal. FIG. 7 is a simplified diagrammatic view of the interaction between the central server 799 of the present invention and a form page of a typical Web site visited by a user at a computer terminal 710. In FIG. 7, the form 780 may correspond to forms 480 and 680 discussed above with reference to FIGS. 4 and 6. The standard Internet browser's capabilities have been expanded to include the utility window 750 which may correspond to utility window 350 described above. As discussed previously, upon login with central server 799, certain of the system utilities may be imported into utility window 750 by means of program code which may affect the appearance and operation of utility window 750.

In this particular embodiment of the present invention, user interface with the form filling function is enabled, and may be presented to the user in the form of an operative button, such as illustrated in FIG. 3 as button 351, or as an operative option in a menu such as 411 in FIG. 4, for example. A detailed description of the interaction between central server 799 and the user's computer terminal 710 with respect to the form filling functionality of the present invention is set forth with reference to FIG. 6 in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

In one embodiment, for example, the programming code at central server 799 may simply extract the appropriate user data from the database records and return that data to the user's computer terminal 710 for filling form 780; the filled or partially filled form 780 may then be displayed to the user, who may alter, delete, or add information selectively. This embodiment provides two advantages: the user has an opportunity to delete or to modify optional information which the user does not wish to supply as specifically recorded in the database; and previously unmapped forms may be mapped according to the information provided by the user. As noted briefly above, the system may alternatively be adapted to submit the form automatically. In such a case, the user may be prompted selectively to supply any optional data at the user's discretion.

It will be appreciated from the foregoing that, once the user has logged in to the registered account at central server, the form filling feature provides a significant convenience. Simply by selecting the form fill option, for example through a utility window or through standard browser interface mechanisms, the user can complete an entire form or portions of a form automatically with little or no manual input. In addition, the system may recognize input from the user when a particular page is unloaded indicating that a form, which has been filled manually by the user, is being submitted independent of the form filling feature. In this manner, the system can "learn" from the user's experiences, mapping forms for future form fill operations invoked by other users.

The system of the present invention also offers appreciable convenience when a user desires to login to a particular registered account at an e-mail server or an e-commerce Web site, for example. A typical Web browser application offers a list, which may be edited, of the Web sites most frequently visited by the user. As commonly implemented, a "bookmarks" or "favorites" list merely enables the user to navigate to a particular site without having to enter the site's URL string; that is, the typical bookmark is only a navigational tool which is capable of no more than directing the browser to a specified address in cyber-space.

The present invention, on the other hand, combines the navigational utility of the typical bookmark with a customized form filling operation which substantially simplifies login procedures by eliminating the need for data input. The net result of this combination is a "smart" bookmark, which not only navigates a user to the login page of a specified account, but also completes and submits the login form, thereby logging the user in to a registered account without further intervention by the user.

The interface for this login feature may be installed into the utility window upon login with the central server as described above with reference to FIG. 3; in this particular instance, the interface may comprise a drop-down menu, for example, which may include an operative option for setting up an account to be displayed as an independent selection in the menu. As an alternative which may be particularly advantageous in the context of mobile or wireless computer devices, the ordinary browser interface is used to invoke the automatic login feature. For example, smart bookmarks may be provided in menu 411 shown in FIG. 4; selection of a site may invoke the automated login feature described below. In either case, requests for login may be directed through the central server of the system.

By way of background, the types of registered accounts to which a user may be entitled access vary considerably. In the same manner in which a user may maintain multiple e-mail accounts at a single e-mail server, a user may also maintain more than one registered account at other types of servers, such as e-commerce Web sites, for example. The system of the present invention accommodates recordation of necessary data concerning multiple accounts in the same domain, corresponding to a home account and a work account, for example, at the same server.

Conversely, an account at one site may entitle a registered user to login at a different Web site in an entirely different domain, perhaps operated by the same entity or a co-brand partner; that is, creating an account at one Web site may potentially entitle the registered user to access that Web site's partner sites in different locations using the same user name and password recognized by the site with which the user is registered. The system of the present invention is able to recognize these types of partnership accounts, at least with respect to mapped sites; this recognition is not limited to the mapped sites.

Since a plurality of accounts may be accessed through the central server, for example, each account for which the login feature may be invoked may be given a unique identifier, or nickname, for identifying the account. The nickname of each account may be displayed to the user, for example, in menu or list form. In the case where a user is attempting to submit data concerning a second or subsequent account in the same domain, the program code at the central server may inform the user that an account already exists at the selected site, and prompt the user to confirm a new user name and password along with a different nickname for the new account.

As noted above, during a particular Web browsing session, a user need only select an account from the menu or list such as menu 411 for example, in order to invoke the program scripts at the central server which will log the user in to the selected registered account. Initially, however, the accounts for which the login feature is activated must be input so as to be recognized by the system. A detailed description of the manner in which account data may be input is provided in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

Figure 8:
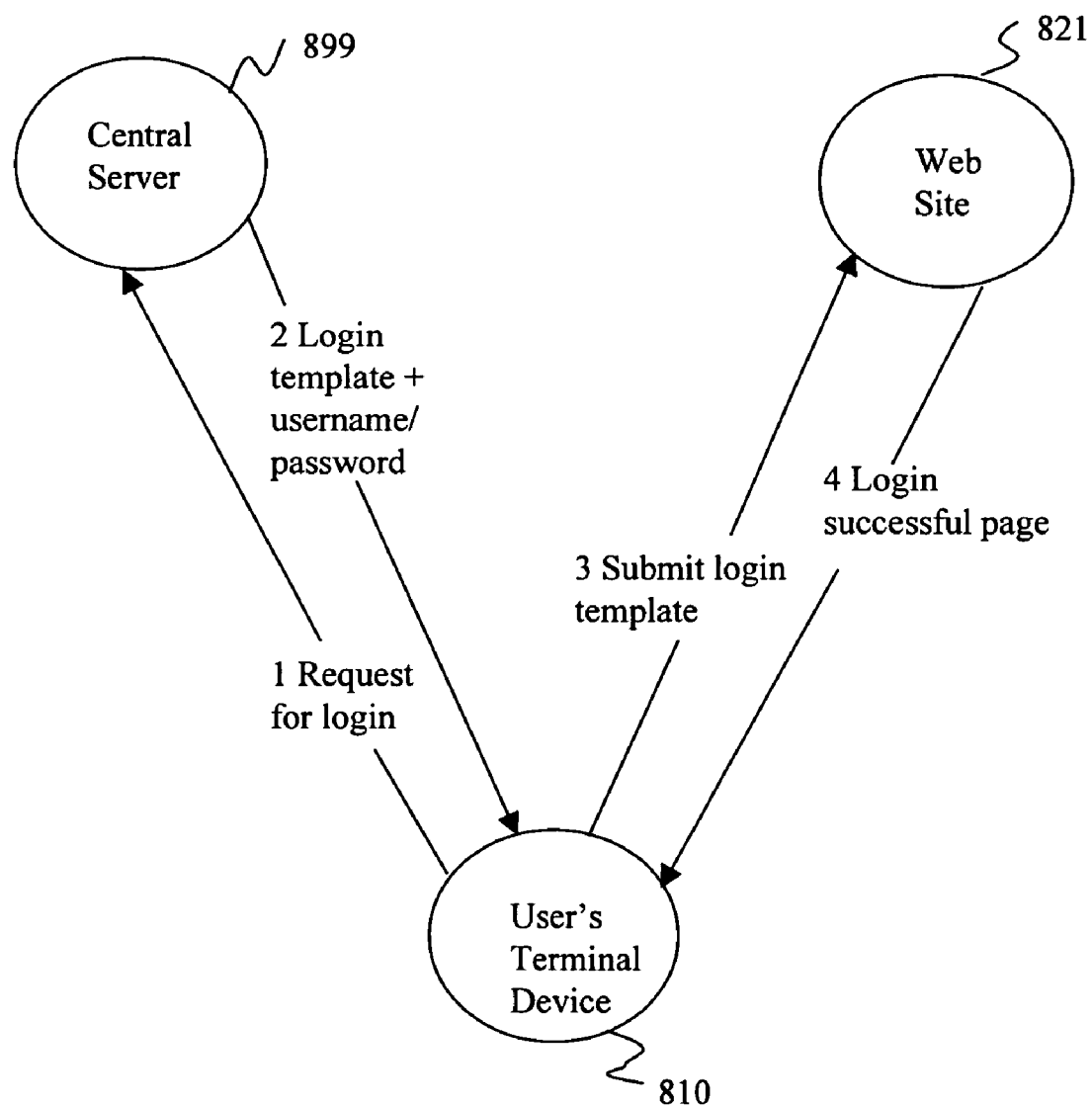
FIG. 8 is a simplified diagrammatic view of one embodiment of the automatic login feature of the present invention.

FIG. 8 is a simplified diagrammatic view of one embodiment of the automatic login feature of the present invention which represents the situation in which the login form for a particular Web site 821 has already been mapped into the system. In this situation, the system already knows the URL of the login page and the structure of the login form; this information may be stored at central server 899, for example, in a form database record associated with a specific form identifier string. A list of recognized Web sites having login forms which are already mapped may be available to the user at the user's computer terminal 810 upon login with central server 899. During browsing, the user may select one of the active options presented, for example, in the menu feature 411 depicted in FIG. 4, to invoke the automatic login process.

In the exemplary automatic login procedure illustrated in FIG. 8, central server 899 may receive a request to log the user into an account maintained at Web site 821; this request is represented by the arrow labeled 1 in FIG. 8. As noted above, subsequent to login with central server 899, all requests for login from the user's computer terminal or device 810 may advantageously be directed through central server 899. Upon invocation of the automatic login procedure, central server 899 may initiate program code employing the form fill technology discussed.

The mapped login form may be retrieved from the database at central server 899 and a "login template" may be created. The login template may generally be a page, created in the appropriate ML, which mimics the normal login page of the site, such as Web site 821, to which the user would like to login. Additionally, the login template includes the appropriate user data associated with the particular account which is required for login; that is, the form filling feature of the present invention is employed to fill the user name and password fields in the correct portions of the login template. In this manner, a login template including all requisite data, in the appropriate format, may be constructed at central server 899. The login template with user name and password data may then be transmitted to the user's device 810, as indicated by the arrow labeled 2 in FIG. 8.

The login feature of the present invention preferably includes the additional step of actually submitting the form without further intervention on the part of the user; this automatic submission is depicted by the arrow labeled 3 in FIG. 8. The program code at central server 899, for example, may execute one or more program scripts in conjunction with creating the login template which may automate form submission, through the user's device 810, to Web site 821. An ML page including a form usually includes an operative button or other form action for executing the submission script which unloads the page and delivers the ML data to the server requesting the form. The login feature of the present invention may include program code which simulates selection of the operative button in the ML page or some other more complicated or sophisticated form action. Accordingly, the form may be submitted under software control, thereby logging the user into the selected account. At the completion of the login process, Web site 821 may send a confirmation page to the browser at device 810, indicating that login was successful; this transmission is illustrated by the arrow labeled 4 in FIG. 8.

A detailed description of automating form submission, for example through simulated selection of a button or other form actions in ML, is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". This detailed description is hereby incorporated by reference.

The embodiment illustrated in FIG. 8 may also be employed in conjunction with cached login pages. As an alternative to a mapped login form, for instance, the system of the present invention may advantageously maintain login pages of various frequently accessed Web sites in a memory cache. It will be appreciated that such a cache arrangement may significantly reduce system overhead and retrieval time for a given automatic login operation.

Figure 9:
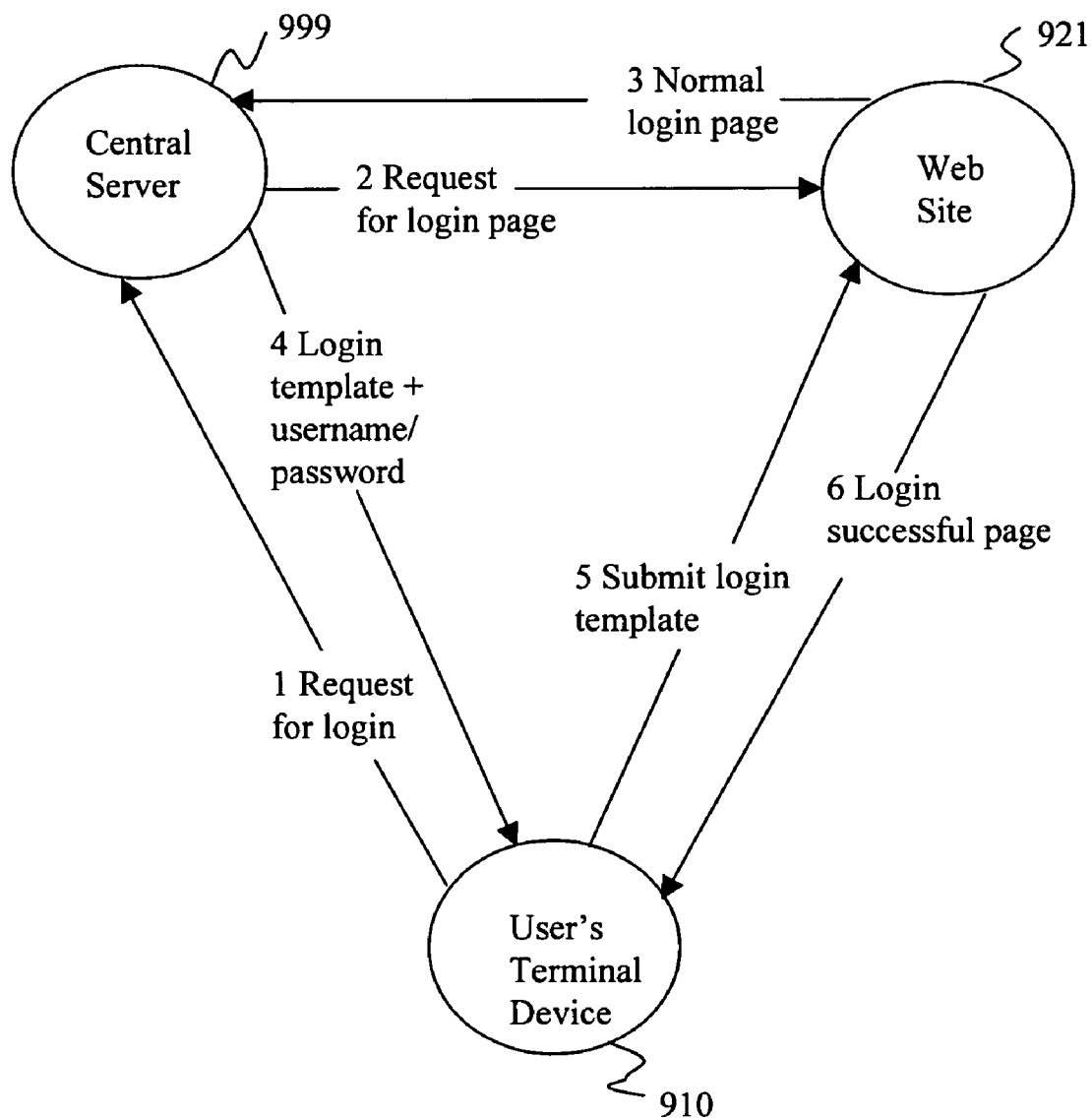
FIG. 9 is a simplified diagrammatic view of another embodiment of the automatic login feature of the present invention.

FIG. 9 is a simplified diagrammatic view of another embodiment of the automatic login feature of the present invention representing the situation in which the login template is generated dynamically when the user invokes the automatic login feature. Dynamic login template generation may be desirable or required, for example, when a login form has not previously been mapped or the login form has been removed from the cache. The embodiment illustrated in FIG. 9 is similar to that depicted in FIG. 8; the interaction between the user's device 910 and the central server 999, as well as the interaction between the user's device 910 and the Web site 921, is substantially the same as that illustrated in FIG. 8.

As shown in FIG. 9, the process of dynamic login template generation additionally involves direct interaction between central server 999 and Web site 921. As indicated by the arrow labeled 2 in FIG. 9, central server 999 may request a normal login page from Web site 921. When the login page is received, central server 999 parses the ML of the login page and identifies the login form. An heuristic algorithm, such as that described in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS", for example, may be implemented at central server 999 to identify the nature and structure of the login form at the URL provided by the user.

In operation, program code at central server 999 may examine the normal login form in sufficient detail to enable the form fill routine to fill out the form accurately; this scenario reduces down to the embodiment illustrated in FIG. 8, i.e. the login form had been previously mapped. The form fill script is invoked and the form may be submitted on behalf of the user as described above. In an alternative embodiment, the system may be adapted not to submit the login template automatically, but rather to give the user the opportunity to confirm that the heuristic algorithm correctly mapped the form and to ensure that the user name and password data have been filled in the proper locations.

Irrespective of the manner in which the registered account is set up to function with the login feature, once the central server has been provided with all of the requisite data, subsequent login with respect to any registered account may be automatic upon selection of the desired account; this selection may either be accomplished through the utility window interface described above with reference to FIG. 3, or through unadulterated browser software options as described above with reference to FIG. 4. The program scripts at the central server may be adapted to procure the login page from the desired Web site. As noted above, a program script may simulate selection of the submission option in the login page ML such that the form is submitted to the Web site, logging the user into the selected registered account automatically.

From the foregoing, it can be seen that a system designed in accordance with the present invention provides a versatile, efficient, and personalized Internet interface for specialized applications, particularly with respect to automating certain interactions which ordinarily must be completed manually. The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

What is claimed is:

1. A system for automating data transactions between computer servers; said system comprising:

a first computer server maintaining a database having stored data recorded therein, said stored data comprising user specific information concerning at least one user, wherein the user specific information comprises at a least a username and passwords associated with a plurality of accounts of the at least one user;

program code residing on said first computer server for creating extracted data by selectively extracting said stored data responsive to a request;

additional program code residing on said first computer server for obtaining a blank form, and for automatically parsing said blank form to identify which of said extracted data should be used to fill in at least a part of said blank form;

form filling program instructions residing on said first computer server for creating a filled form by filling in said blank form using at least a portion of the user specific information;

form submitting instructions residing on said first computer server, wherein said form submitting instructions direct automatically submitting said filled form to a second computer serve; and a mobile client device having a user interface, said user interface having a menu of favorites, the device further configured to enable a client to make a selection from said menu, said selection automatically triggering transmission of a signal to said first computer server invoking said program code and said additional program code for said selection.

2. The system of claim 1 wherein said extracted data comprises data for all fields in said blank form.

3. The system of claim 1 wherein said blank form is obtained from said second computer server.

4. The system of claim 1 wherein said blank form comprises a login form.

5. The system of claim 1 further comprising:

database having stored form data recorded therein; said stored form data relating to forms required by at least one other computer server.

6. The system of claim 5 wherein said additional program code comprises instructions for comparing data fields in said blank form with said stored form data recorded in said additional database.

7. The system of claim 5 wherein said stored form data comprises parsed form data from said at least one other computer server.

8. A method for automating data transactions between computer servers, comprising the steps of:

maintaining a database having stored data recorded therein, said stored data comprising user specific information concerning at least one user, wherein the user specific information comprises at a least a username and passwords associated with a plurality of accounts of the at least one user;

selectively extracting at least a portion of the user specific information responsive to a request;

obtaining a blank form;

automatically parsing said blank form to identify which of the user specific information should be used to fill in at least a part of said blank form;

filling in said blank form using said portion of the user specific information;

automatically submitting the completed form to a second computer server;

directing said request by a user from a mobile client device having a user interface, said user interface having a menu of favorites;

receiving a selection from said menu of said mobile client device; and responsive to said selection, automatically triggering transmission of a signal to said first computer server invoking said selectively extracting step and said obtaining a blank form step for said selection.

9. The method of claim 8, wherein said step of selectively extracting comprises extracting data for all fields in said blank form.

10. The method of claim 8, wherein said step of obtaining a blank form comprises receiving form data from said second computer server.

11. The method of claim 8, wherein said step of obtaining a blank form comprises receiving login form data from a second computer server.

12. The method of claim 8, further comprising a step of:
maintaining an additional database at said first computer server; said additional database having stored form data recorded therein; said stored form data relating to forms required by at least one other computer server.

13. The method of claim 12, wherein said step of parsing comprises comparing data fields in said blank form with said stored form data recorded in said additional database.

14. The method of claim 12, wherein said step of maintaining an additional database includes parsing form data from said at least one other computer server.

15. The method of claim 13 further comprising a step of:
as a result of said parsing, filling in said blank form using said fuzzy fill procedure.

16. A method for automating login transactions, comprising the steps of:
maintaining a database having stored data recorded therein at a first computer server, said stored data comprising user specific information concerning at least one user, wherein the user specific information comprises at a least a username and passwords associated with a plurality of accounts of the at least one user;
selectively extracting at least a portion of the user specific information responsive to a request;
obtaining a blank login form;
automatically parsing said blank login form to identify which of said stored data should be used to fill in at least a part of said blank login form;
filling in said blank login form using said portion of the user specific information;
automatically submitting the completed login form to a second computer server;
directing said request by a user from a mobile client device having a user interface, said user interface having a menu of favorites;
receiving a selection from said menu of said mobile client device; and
responsive to said selection, automatically triggering transmission of a signal to said first computer server invoking said selectively extracting step and said obtaining a blank form step for said selection.

17. The method of claim 16 wherein said step of selectively extracting comprises extracting data for all fields in said blank login form.

18. The method of claim 16 wherein said step of obtaining a blank login form comprises receiving form data from said second computer server.

19. The method of claim 16 further comprising a step of:
maintaining an additional database at said first computer server; said additional database having stored form data recorded therein; said stored form data relating to login forms required by at least one other computer server.

20. The method of claim 19 wherein said step of parsing comprises comparing data fields in said blank login form with said stored form data recorded in said additional database.

21. The method of claim 19 wherein said step of maintaining an additional database comprises parsing login form data from said at least one other computer server.

* * * * *

UNITED STATES PATENT AND TRADEMARK OFFICE
CERTIFICATE OF CORRECTION

PATENT NO. : 7,330,876 B1  Page 1 of 1
APPLICATION NO. : 09/687991
DATED : February 12, 2008
INVENTOR(S) : Jai Rawat et al.

It is certified that error appears in the above-identified patent and that said Letters Patent is hereby corrected as shown below:

Title page, item [75] Inventors should read as follows: Jai Rawat, Sunnyvale, CA (US); Silvia Doundakova, San Jose, CA (US); Vladimir Fridman, Menlo Park, CA (US); Rajalakshmi Subramanian, Sunnyvale, CA (US); Geoffrey George Chemmannoor, Sunnyvale, CA (US); Kesapragada Ravi Shankar, Sunnyvale, CA (US); Subbu Gandrala, San Ramon, CA (US); Simon Waddington, Oakland, CA (US); Benedict T.S. Gladstone, Suffolk (GB)

Signed and Sealed this

Twenty-seventh Day of May, 2008

JON W. DUDAS
*Director of the United States Patent and Trademark Office*